C. M. HUGGINS AND C. J. CLINE.
AUTOMOBILE WHEEL ATTACHMENT.
APPLICATION FILED FEB. 7, 1921.
1,411,886.
Patented Apr. 4, 1922.
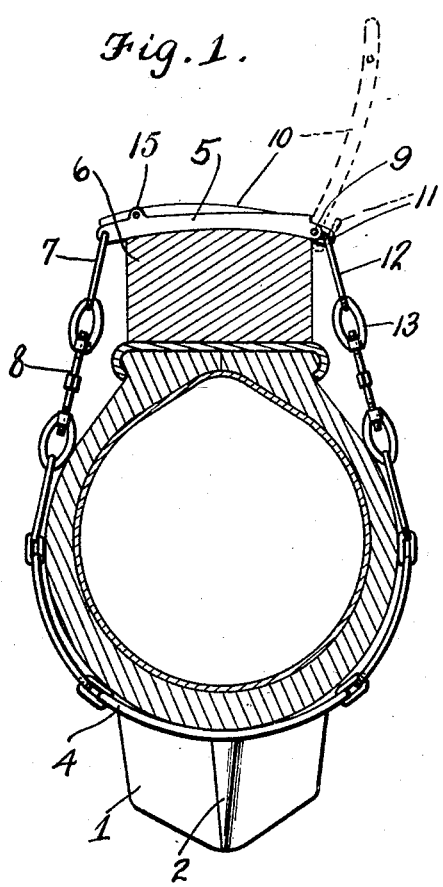
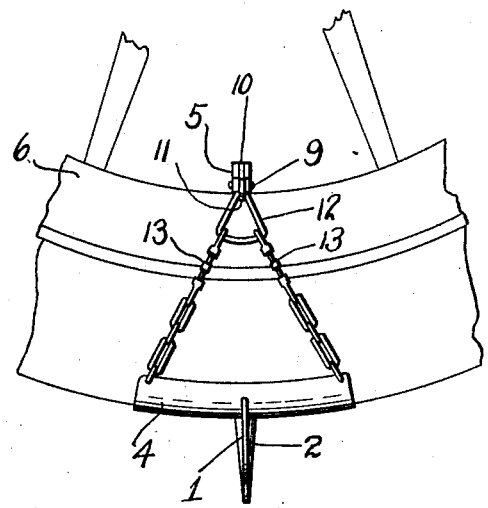
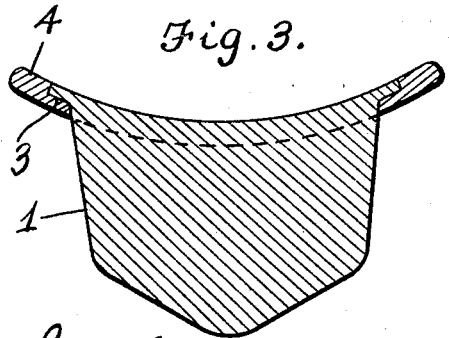
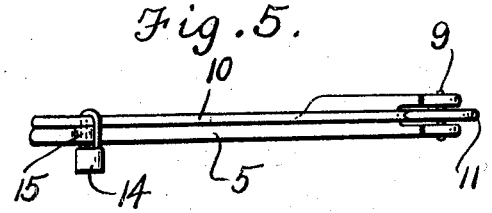
C. M. Huggins & C. J. Cline INVENTORS

UNITED STATES PATENT OFFICE.

CLAUDE MACKEY HUGGINS AND CALVIN JOHN CLINE, OF NEWARK, OHIO.

AUTOMOBILE WHEEL ATTACHMENT.

1,411,886.      Specification of Letters Patent.      Patented Apr. 4, 1922.

Application filed February 7, 1921. Serial No. 443,182.

*To all whom it may concern:*

Be it known that we, CLAUDE M. HUGGINS and CALVIN J. CLINE, both citizens of the United States, residing at Newark, in the county of Licking and State of Ohio, have invented new and useful Improvements in Automobile Wheel Attachments, of which the following is a specification.

The object of our present invention is the provision of an anti-slip and non-theft attachment for automobile wheels susceptible of being quickly and easily secured on the tire portion of an automobile wheel in such position as to enable its ground-engaging blade to operate to the best advantage in extricating a wheel from a hole by preventing slipping of the wheel, and in preventing rotation of the wheel on a smooth roadway to such an extent as to attract notice and prevent theft of an automobile.

To the attainment of the foregoing, the invention consists in the improvement as hereinafter described and definitely claimed.

In the accompanying drawings, forming part hereof:—

Figure 1 is a view showing the tire portion of a wheel in transverse section with our improvement properly applied.

Figure 2 is a side elevation of the same.

Figures 3 and 4 are detail sectional views hereinafter explicitly referred to.

Figure 5 is a view showing the application of a pad-lock when the attachment is to be secured against unauthorized removal from the wheel.

Similar numerals of reference designate corresponding parts in all of the views of the drawings.

Among other elements our novel attachment comprises a blade 1 designed to be arranged transversely of and to project radially from the tire of a wheel as appears in Figure 1. The said blade 1 is preferably ribbed at its opposite sides in its transverse center as indicated by 2 in order to lend increased stiffness and strength to the blade. Said blade 1 is preferably inserted and secured in a slot 3 in a concavo-convex shoe 4 of metal or other appropriate material, a base flange on the blade being seated in a recess in the inner side of the shoe 4, Figures 3 and 4. We would have it understood, however, that it is within the purview of our invention to fix the blade 1 to the shoe 4 in any approved manner or to form the said blade 1 integral with the shoe 4.

The shoe 4 is designed to be arranged against the tread portion of the wheel tire in the manner illustrated, and in addition to the said shoe 4 and the blade 1 thereon our improvement includes a clamp body 5 to be arranged transversely at the inner side of the felly 6 of a wheel. One end of the said clamp body 5 is connected by links 7 with one edge of the shoe 4, and in the preferred embodiment of the invention each of the links 7 includes a turn buckle 8 by which the links may be rendered taut when necessary. Pivoted at 9 to one end of the clamp body 5 is the lever 10 of the clamp which lever has a looped portion 11 adjacent to its center of movement. The said looped portion 11 is connected by links 12 with the opposite edge of the shoe 4, and these links 12 are also, by preference, provided with turn buckles 13.

It will be apparent from the foregoing that the links 12 may be expeditiously and easily connected to and disconnected from the lever 10 in the application or removal of the attachment, and that when the lever 10 subsequently to an application of the attachment is positioned as shown by full lines in Figure 1 the attachment will be strongly and securely held on the tire portion of the wheel.

Manifestly when applied as stated the attachment will serve efficiently to extricate a drive wheel of an automobile from a hole in a roadway, and will also serve efficiently in the extrication of an automobile from a bad spot when the drive wheel to which the attachment is applied is not in a hole.

When our attachment is applied to the tire portion of a front wheel on an automobile, and the lock 14, Figure 5, is secured in the apertured lugs 15 of the clamp body 5 movement of the clamping lever 10 from the position illustrated will be precluded. Consequently the attachment cannot be removed from the wheel by an unauthorized person, and hence it follows that the attachment will serve efficiently as a non-theft signal and as a means of preventing free movement of an automobile.

Having described our invention, what we claim and desire to secure by Letters-Patent, is:—

1. A wheel attachment comprising a clamp body adapted to be arranged transversely at the inner side of a wheel felly, a clamp lever pivoted at one end to one end of the body and having a looped heel portion, said lever when closed being adapted to rest alongside of and close to the clamp body, a concavo-convex shoe adapted to rest against the tread portion of a wheel tire, a blade or lug carried by and projecting radially from the shoe, said lug extending transversely of the shoe, links interposed between one edge of the shoe and one end of the clamp body, and a link connected to the opposite edge of the shoe and adapted to be connected to and disconnected from the looped heel portion of the clamp lever.

2. A wheel attachment comprising a clamp body adapted to be arranged transversely at the inner side of a wheel felly, a clamp lever pivoted at one end to one end of the body and having a looped heel portion, said lever when closed being adapted to rest alongside of and close to the clamp body, a concavo-convex shoe adapted to rest against the tread portion of a wheel tire, a blade or lug carried by and projecting radially from the shoe, said lug extending transversely of the shoe, links interposed between one edge of the shoe and one end of the clamp body and including turn buckles, and a link connected to the opposite edge of the shoe and adapted to be connected to and disconnected from the looped heel portion of the clamp lever; the said clamp body and clamp lever being provided with apertures to receive the bow of a pad-lock.

3. A wheel attachment comprising a clamp body adapted to be placed transversely against the inner side of a wheel felly, a lever pivoted to one end of said body and having a looped heel portion adjacent to the end of the clamp body, said lever when closed being arranged to rest alongside the clamp body, a shoe of concavo-convex form in cross section, a flexible connection between one edge of said shoe and one end of the clamp body, and a flexible connection on the other edge of the shoe and looped to receive and be detachably connected to the looped heel portion of the clamp lever, and a radially projecting and transversely extending blade or lug at the outer side of the shoe and carried thereby.

In testimony whereof we affix our signatures.

CLAUDE MACKEY HUGGINS.
CALVIN JOHN CLINE.